US012163635B1

(12) United States Patent
Thompson

(10) Patent No.: US 12,163,635 B1
(45) Date of Patent: Dec. 10, 2024

(54) ILLUMINATED RUB RAIL

(71) Applicant: Fire Water Holdings, Inc., Piedmont, OK (US)

(72) Inventor: Wes Thompson, Piedmont, OK (US)

( * ) Notice: Subject to any disclaimer, the term of this patent is extended or adjusted under 35 U.S.C. 154(b) by 0 days.

(21) Appl. No.: 17/576,887

(22) Filed: Jan. 14, 2022

Related U.S. Application Data

(60) Provisional application No. 63/137,807, filed on Jan. 15, 2021.

(51) Int. Cl.

| | |
|---|---|
| ***F21S 4/28*** | (2016.01) |
| ***B63B 45/06*** | (2006.01) |
| ***F21V 23/00*** | (2015.01) |
| ***F21W 107/20*** | (2018.01) |
| ***F21Y 113/10*** | (2016.01) |
| ***F21Y 115/10*** | (2016.01) |

(52) U.S. Cl.
CPC ................ *F21S 4/28* (2016.01); *B63B 45/06* (2013.01); *F21V 23/003* (2013.01); *F21W 2107/20* (2018.01); *F21Y 2113/10* (2016.08); *F21Y 2115/10* (2016.08)

(58) Field of Classification Search
CPC .......... F21S 4/28; B63B 45/06; F21V 23/003; F21W 2107/20; F21Y 2113/10; F21Y 2115/10
See application file for complete search history.

(56) References Cited

U.S. PATENT DOCUMENTS

| | | | | |
|---|---|---|---|---|
| 5,730,079 A | 3/1998 | Totty et al. | | |
| 6,231,217 B1 | 5/2001 | Krippelz, Sr. | | |
| 6,474,851 B1 | 11/2002 | Baley | | |
| 6,644,829 B1 * | 11/2003 | Tracy | F21V 21/088 | 362/397 |
| 6,733,161 B2 * | 5/2004 | Tufte | F21S 4/20 | 362/540 |
| 7,264,384 B1 * | 9/2007 | Ryan | B63B 45/04 | 362/543 |
| 7,291,852 B1 | 11/2007 | Matlack et al. | | |
| 7,401,949 B2 | 7/2008 | Tufte | | |
| 7,550,931 B2 * | 6/2009 | Lys | H05B 47/10 | 362/253 |
| 8,277,098 B2 | 10/2012 | Ortwein et al. | | |
| 8,622,445 B1 | 1/2014 | Portnoy et al. | | |
| 9,694,883 B1 | 7/2017 | Bonventure | | |
| 9,969,469 B1 * | 5/2018 | Bell | H05B 45/20 | |
| D848,241 S | 5/2019 | Meyers et al. | | |
| 2004/0179358 A1 * | 9/2004 | Tufte | F21S 4/20 | 362/223 |
| 2005/0174473 A1 * | 8/2005 | Morgan | H05B 45/355 | 348/370 |
| 2005/0225976 A1 * | 10/2005 | Zampini | B63B 45/04 | 362/227 |
| 2005/0237730 A1 * | 10/2005 | Barnes | F21K 2/06 | 362/542 |

(Continued)

*Primary Examiner* — Tsion Tumebo
(74) *Attorney, Agent, or Firm* — Cramer Patent & Design PLLC; Aaron R. Cramer

(57) ABSTRACT

An illuminated rub rail is an illuminated boat rub rail in wireless communication with a control means and in electrical communication with an audio source. A user may selectable allow the audio source to synchronize the illumination to the beat of the audio source. A plurality of other illumination patterns may be selected.

1 Claim, 5 Drawing Sheets

(56) References Cited

U.S. PATENT DOCUMENTS

| | | | | |
|---|---|---|---|---|
| 2006/0022214 | A1* | 2/2006 | Morgan | H05B 45/40 257/E25.032 |
| 2006/0250269 | A1* | 11/2006 | Wang | H05B 45/22 340/815.45 |
| 2008/0122607 | A1* | 5/2008 | Bradley | H04B 10/1125 340/475 |
| 2010/0084997 | A1* | 4/2010 | Oberzeir | F21L 4/027 362/183 |
| 2012/0026726 | A1* | 2/2012 | Recker | H05B 47/13 362/157 |
| 2013/0076269 | A1* | 3/2013 | Shilton | H05B 47/17 315/362 |
| 2013/0141901 | A1* | 6/2013 | Martzall | F21S 9/037 362/183 |
| 2014/0265555 | A1* | 9/2014 | Hall | H02J 50/50 307/9.1 |
| 2015/0035437 | A1* | 2/2015 | Panopoulos | B60L 53/12 315/291 |
| 2015/0070925 | A1* | 3/2015 | Berg-Hagen | H05B 47/10 362/523 |
| 2018/0026329 | A1* | 1/2018 | Johnson | F21V 3/00 343/721 |
| 2018/0299115 | A1* | 10/2018 | Coelho | F21V 21/0808 |
| 2018/0362126 | A1* | 12/2018 | Christensen | F21V 14/02 |
| 2019/0116640 | A1* | 4/2019 | Rollinson | F21V 23/04 |
| 2020/0290710 | A1* | 9/2020 | Edwards | B63B 73/00 |

* cited by examiner

ILLUMINATED RUB RAIL

RELATED APPLICATIONS

The present invention is a continuation-in-part of and claims the benefit of U.S. Provisional Application No. 63/137,807, filed Jan. 15, 2021, the entire disclosures of which are incorporated herein by reference.

FIELD OF THE INVENTION

The present invention relates generally to illuminating rub rail of a watercraft and a control means thereof.

BACKGROUND OF THE INVENTION

To those that truly love boating and being out on the water, there is nothing more pleasing or satisfying than spending time in the captain's chair. Whether it be a small vessel or large boat, motor-driven or sail-propelled, the sense of freedom and feeling of being at one with nature is at its highest when traveling upon the water. This sense of pride results in the boating public being on the constant lookout for additional ways to make their watercraft stand out from the rest. Such accessories allow boaters to make their boat more unique and get noticed by others. But as with many customization techniques, as they catch on, more and more people do the same thing and then one customized boat begins to look the next. As such, the boating public, as well as boating accessory manufacturers, are on a continual search for means by which watercraft can be modified to be more unique and eye-catching. The development of the rub rail lighting system fulfills this need.

SUMMARY OF THE INVENTION

The disadvantages of the prior art are overcome by the present invention in providing a rub rail lighting system that has, an internal first light source adapted to be disposed on an interior of a rub rail adapted to provide illumination in a linear manner along both a port side and a starboard side of a watercraft, a plurality of wiring electrically connected to a combination control box, a wireless control box controlled by a wireless control device via a radiofrequency wave, a base molding bordering and holding an insert, and a data connection linking one or more additional radiofrequency controllers, one or more additional second light source amplifiers housed in one or more additional combination control boxes, one or more additional amplifier control boxes, or one or more additional wireless control boxes to an external device.

The combination control box houses a radiofrequency controller and a second light source amplifier that is adapted to receive a plurality of electrical power from the watercraft, and the wiring is electrically connected to an amplifier control box.

The rub rail lighting system may further comprise a second light source that may be mounted to a mounting strip disposed on an interior portion of the base molding. The second light source may be diffused and may be emitted from an exterior side of the insert as illumination in one or more colors. The second light source may be RGB. The second light source may be an LED. The wireless control device through the radiofrequency controller may control coloring of the second light source as well as brightness, fade, one or more strobe patterns, and one or more other visual effects. The radiofrequency controller and the second light source amplifier may be housed in a watertight enclosure. The rub rail lighting system may further comprise a plurality of mounting brackets that may be disposed on outside of the watertight enclosure to ensure watertightness.

The rub rail lighting system may further comprise a radiofrequency antenna that may be attached to the radiofrequency controller. The wireless control device may be a dedicated controller. The wireless control device may be a personal electronic device. The personal electronic device may be a smartphone. a transparent first cover may be attached to the amplifier control box via a plurality of first attachment holes. The radiofrequency wave may be Bluetooth. The radiofrequency controller may provide acceptance of an audio input signal for connection to any style of audio source to the wireless control device. The base molding may be made of opaque flexible rubber. The base molding may be made of stainless steel. The insert may be translucent. The external device may be a DMX controller. The watercraft may be a ski boat.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
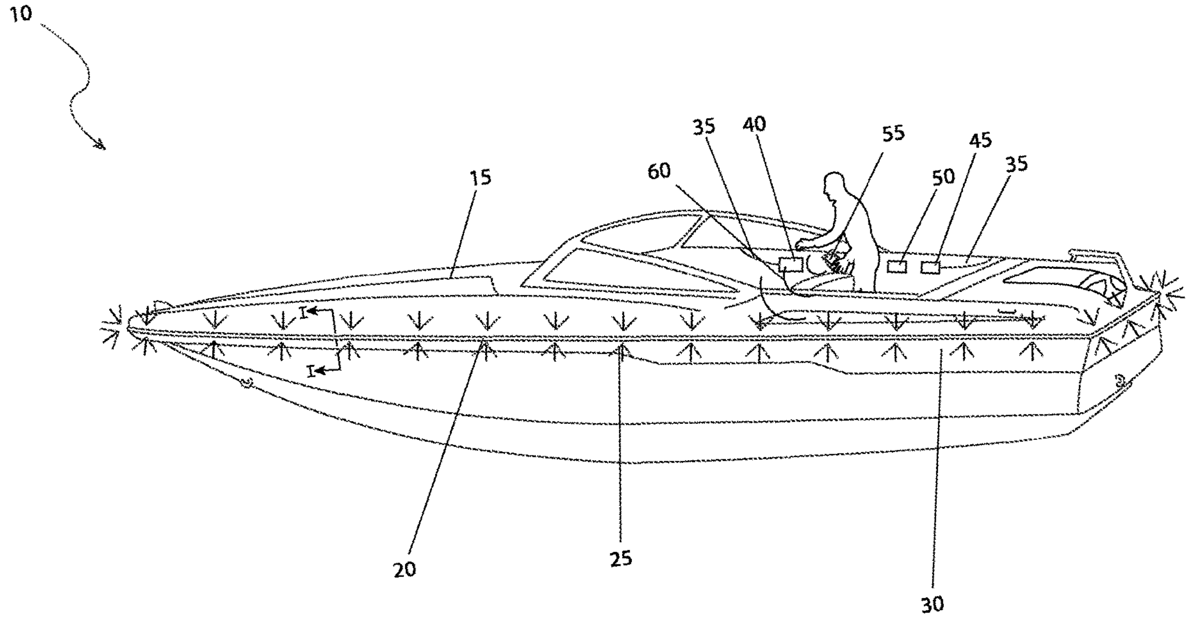
FIG. 1 is an environmental view of the rub rail lighting system, installed on a boat, according to the preferred embodiment of the present invention.

10 rub rail lighting system
15 watercraft
20 rub rail
25 first light source
30 illumination
35 wiring
40 combination control box
41 first cover
45 amplifier control box
46 second cover
50 wireless control box
51 third cover
55 wireless control device
60 radio frequency wave
65 base molding
70 insert
75 LED
80 mounting strip
85 radiofrequency controller
90 second light source amplifier
95 watertight enclosure
100 first attachment hole

101 second attachment hole
102 third attachment hole
105 radiofrequency antenna
110 power connection
115 data connection
120 light source linkage wiring
125 mounting bracket

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, an environmental view of the rub rail lighting system 10, installed on a watercraft 15, according to the preferred embodiment of the present invention is disclosed. The rub rail lighting system (herein also described as the "system") 10 is integrated into the rub rail 20 of the watercraft 15. The watercraft 15 is depicted as a ski boat for purposes of illustration. However, any watercraft 15 equipped with a rub rail 20 can be utilized with the teachings of the present invention. Thus, the use of any particular type of watercraft 15 is not intended to be a limiting factor of the present invention. The rub rail 20 is provided along an exterior upper surface of the watercraft 15 in a typical manner. The rub rail 20 is provided with an internal first light source 25, preferably a light-emitting diode (LED) on its interior to provide illumination 30 in a linear manner along both port and starboard sides of the watercraft 15. Further detail on the construction of the watercraft 15 will be provided herein below.

Wiring 35 provides an electrical connection to a combination control box 40 or an amplifier control box 45. A wireless control box 50 may also be provided as part of the system 10. The system 10 is controlled by a wireless control device 55 such as a dedicated controller or a personal electronic device (e.g., smart phone) via a radiofrequency wave 60 such as Bluetooth®. Further disclosure on the wiring 35 and control methods will be provided herein below.

Figure 2:
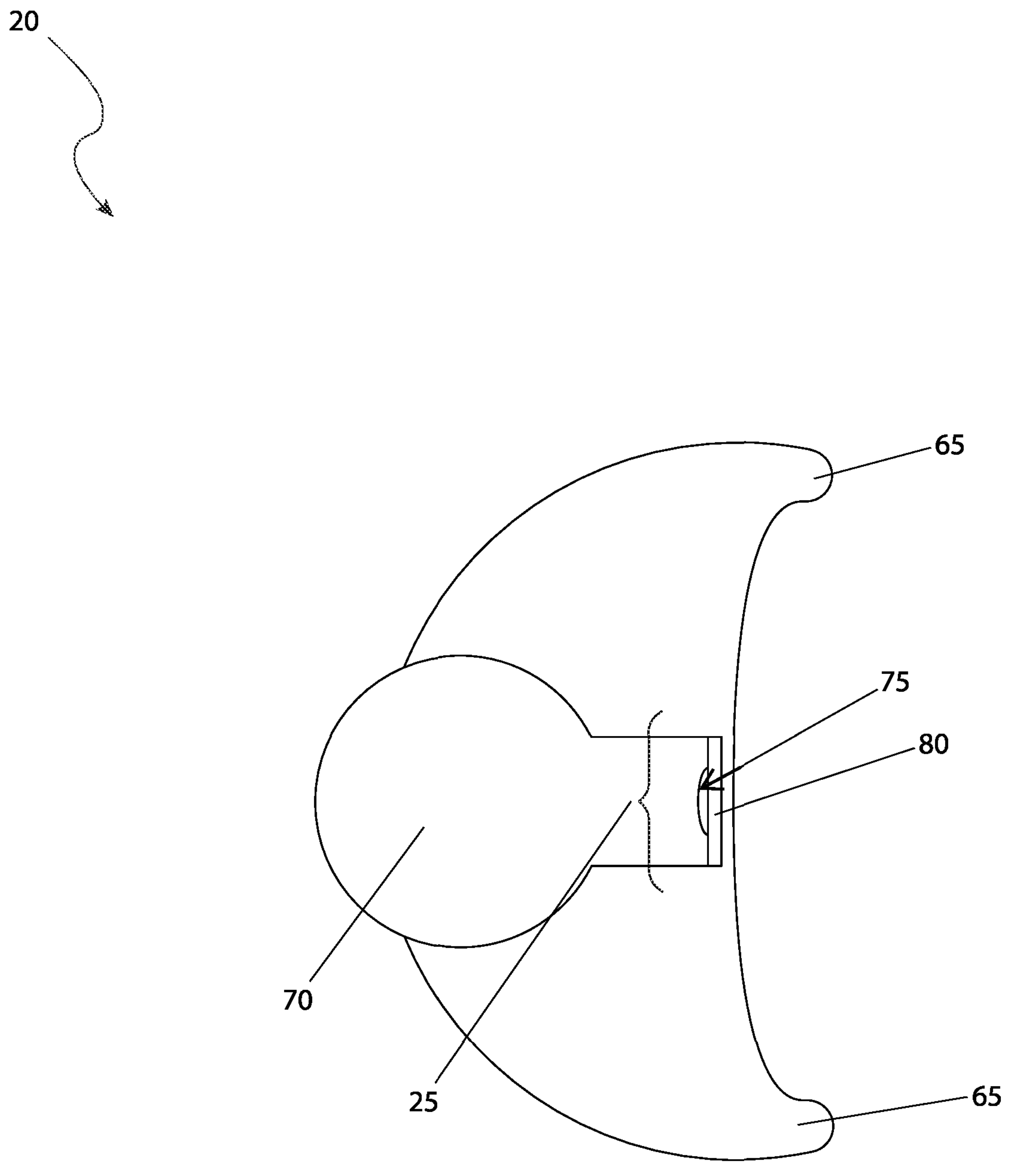
FIG. 2 is a sectional view of the rub rail lighting system, as seen along a Line I-I, as shown in FIG. 1, according to the preferred embodiment of the present invention.

Referring next to FIG. 2, a sectional view of the system 10, as seen along a Line I-I, as shown in FIG. 1, according to the preferred embodiment of the present invention is depicted. The rub rail 20 comprises a base molding 65 that borders and holds an insert 70. The base molding 65 is envisioned to be made of opaque flexible rubber, perhaps of the color black, while the insert 70 is of a translucent nature. The base molding 65 may be provided in other materials, such as stainless steel, construction, configuration and the like. As such, the exact parameters of the base molding 65 shall not be a limiting factor of the present invention. The first light source 25 includes an LED 75 mounted to a mounting strip 80 at the interior portion of the base molding 65. The illumination 30 is then diffused and is emitted from the exterior side of the insert 70 as illumination 30 in various wavelengths (colors). It is envisioned that the LED 75 and the mounting strip 80 are impact resistant and waterproof.

Figure 3:
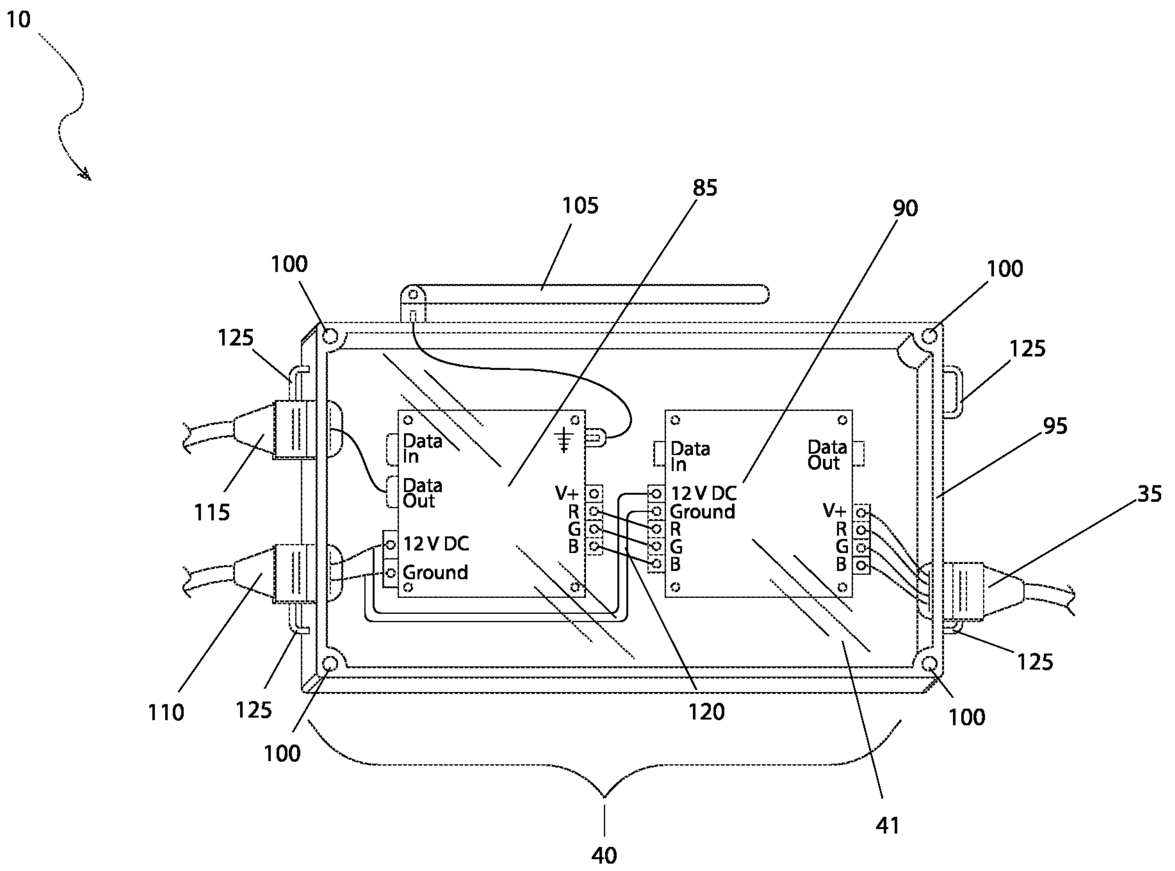
FIG. 3 is an interior view of the combination control box as used with the rub rail lighting system, according to the preferred embodiment of the present invention.

Referring now to FIG. 3, an interior view of the combination control box 40 as used with the system 10, according to the preferred embodiment of the present invention is shown. The combination control box 40 houses a radiofrequency controller 85 and a second light source amplifier 90 in a watertight enclosure 95. It is envisioned that a transparent first cover 41 is attached to the combination control box 40 via first attachment holes 100. A radiofrequency antenna 105 is attached to the radiofrequency controller 85. A power connection 110, envisioned to be provided from the conventional electrical power system as found on the boat 15 (as shown in FIG. 1) is electrically connected to the radiofrequency controller 85 and the second light source amplifier 90. A data connection 115 allows linking of multiple radiofrequency controllers 85 or second light source amplifiers 90 housed in additional combination control boxes 40, amplifier control boxes 45 or wireless control boxes 50 (all of which are shown in FIG. 1), or to an external device such as DMX controller. The wiring 35 for the first internal light source 25 (as shown in FIG. 1) exits the second light source amplifier 90 and the watertight enclosure 95. Linkage wiring 120 is provided between the radiofrequency controller 85 and the second light source amplifier 90. Multiple mounting brackets 125 are provided on the exterior of the watertight enclosure 95 to ensure watertightness. The combination control box 40 may be used on its own with the system 10 or connected to additional amplifier control boxes 45 and/or wireless control boxes 50 for large installations on large watercraft 15 (as shown in FIG. 1). The radiofrequency controller 85, through the radiofrequency wave 60 to the wireless control device 55 (both as shown in FIG. 1) provides acceptance of an audio input signal for connection to any style of audio source. Additionally, the wireless control device 55 through the radiofrequency controller 85 can control the color of the LED 75 as well as brightness, fade, strobe patterns, and other visual effects.

Figure 4:
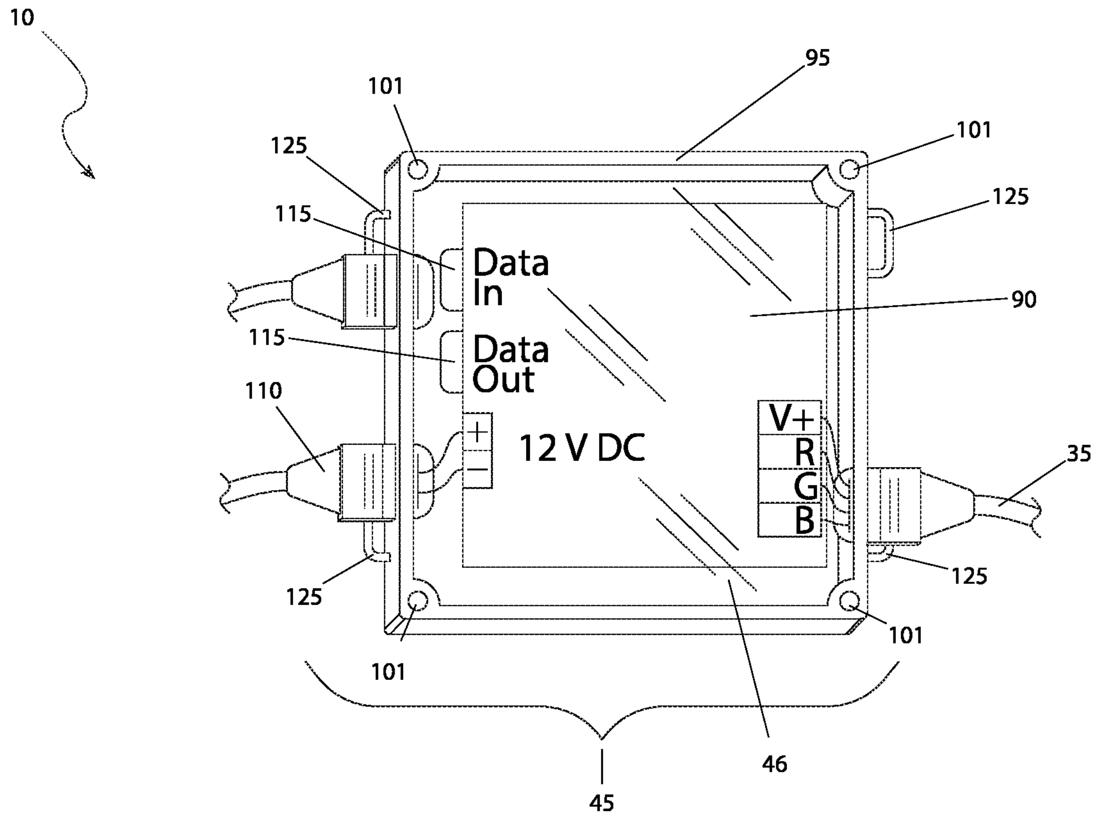
FIG. 4 is an interior view of the amplifier control box as used with the rub rail lighting system, according to the preferred embodiment of the present invention.

Referring next to FIG. 4, an interior view of the amplifier control box 45 as used with the system 10, according to the preferred embodiment of the present invention is disclosed. The amplifier control box 45 houses a second light source amplifier 90 in a watertight enclosure 95. It is envisioned that a transparent second cover 46 is attached via second attachment holes 101. A power connection 110 is electrically connected to the second light source amplifier 90. A data connection 115 allows linking of multiple radiofrequency controllers 85 or second light source amplifiers 90 (as shown in FIG. 3) housed in additional combination control boxes 40, amplifier control boxes 45 or wireless control boxes 50 (all of which are shown in FIG. 1). The wiring 35 for the first light source 25 (as shown in FIG. 1) exits the second light source amplifier 90 and the watertight enclosure 95. Multiple mounting brackets 125 are provided on the exterior of the watertight enclosure 95 to ensure watertightness. The amplifier control box 45 may be used on its own with the system 10 or connected to additional combination control box 40 and/or wireless control box 50 for large installations on large watercraft 15 (as shown in FIG. 1).

Figure 5:
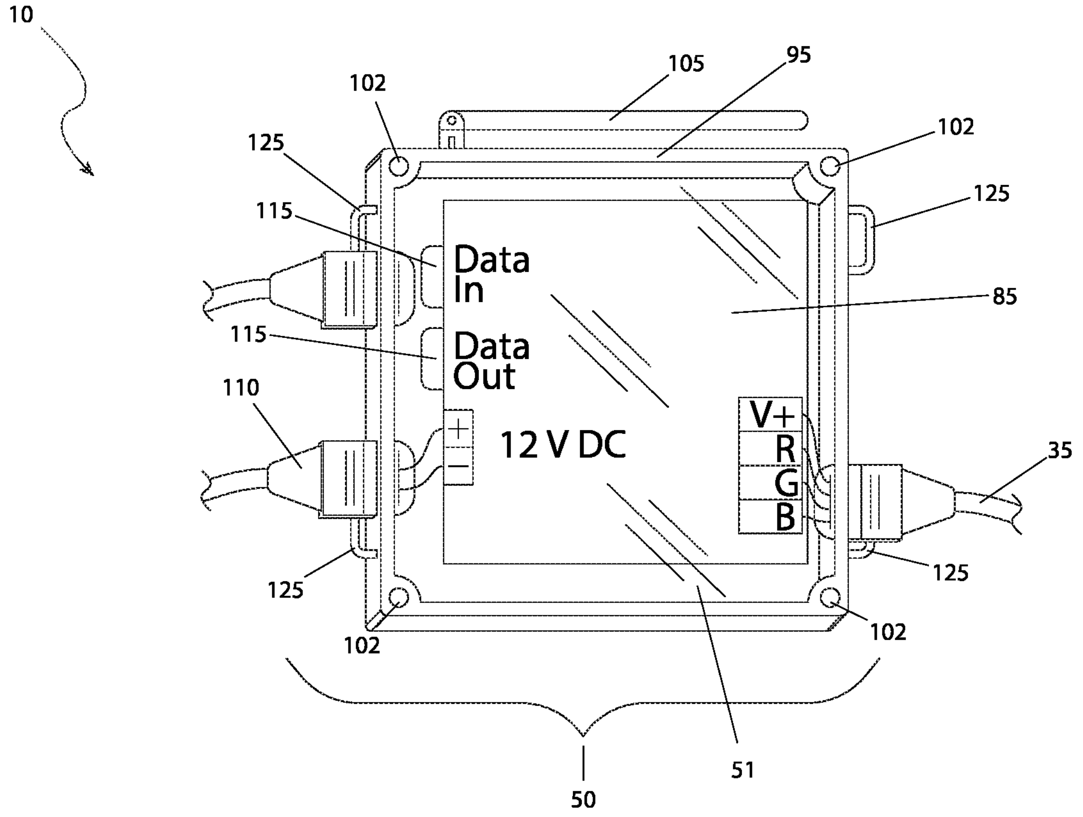
FIG. 5 is an interior view of the wireless control box as used with the rub rail lighting system, according to the preferred embodiment of the present invention.

Referring to FIG. 5, an interior view of the wireless control box 50 as used with the system 10, according to the preferred embodiment of the present invention is depicted. The wireless control box 50 houses a radiofrequency controller 85 in a watertight enclosure 95. It is envisioned that a transparent third cover is attached via third attachment holes 103. A radiofrequency antenna 105 is attached to the radiofrequency controller 85. A power connection 110 is electrically connected to the radiofrequency controller 85. A data connection 115 allows linking of multiple radiofrequency controllers 85 or second light source amplifiers 90 (as shown in FIGS. 3 and 4) housed in additional combination control boxes 40, amplifier control boxes 45 or wireless control boxes 50 (all of which are shown in FIG. 1) or to an external device such as DMX controller. The wiring 35 for the first light source 25 (as shown in FIG. 1) exits the radiofrequency controller 85 and the enclosure 95. Multiple mounting brackets 125 are provided on the exterior of the enclosure 95 to ensure watertightness. The wireless control box 50 may be used on its own with the system 10 or connected to additional combination control box 40 and/or amplifier control box 45 for large installations on large watercraft 15 (as shown in FIG. 1). The radiofrequency controller 85, through the radiofrequency wave 60 to the wireless control device 55 (both as shown in FIG. 1) provides acceptance of an audio input signal for connection to any style of audio sources. Additionally, the wireless control device 55 through the radiofrequency controller 85 can control the color of the LED 75 as well as brightness, fade, strobe patterns, and the like.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 5. The user would procure the system 10 from conventional procurement channels such as watercraft dealers, marine supply houses, mail order and internet supply houses and the like. Special attention would be paid to the design, size, style and length of the rub rail 20, the needed quantity of combination control boxes 40, amplifier control boxes 45, and/or wireless control boxes 50, and the desired wireless control device 55.

After procurement and prior to utilization, the system 10 would be prepared in the following manner: the rub rail 20 would be installed on the watercraft 15, either during initial construction of the watercraft 15 or retrofit installation after an existing rub rail 20 is removed. Multiple segments of rub rail 20, either on the port side or the starboard side, or on multiple levels (decks) would be interconnected by wiring 35 to the various combination control box 40, or combination of amplifier control box 45 and wireless control box 50. An initial pairing or link to the wireless control device 55 would then be performed. At this point in time, the system 10 is ready for operation.

During utilization of the system 10, the following procedure would be initiated: the user would activate the system 10 via manipulation of the wireless control device 55; various operating parameters such as color, brightness, fade, strobe patterns, and the like; control of the LED 75 may be governed by a music interface (such as via a DMX device). The resultant illumination 30 afforded by the system 10 surrounds the entire watercraft 15, catching the attention of all around. It also makes the watercraft 15 more visible in diminished ambient light, thus increasing safety as well. Various patterns can be changed at will by the user.

After use of the system 10, it is simply deactivated by the wireless control device 55. In addition to general illumination 30, the features of the system 10 provide for enhanced safety. It is envisioned that illumination 30 in specific pre-programmed patterns can alert others to distress by flashing SOS. It may also flash alternating red and blue patterns for law enforcement operations. It would be provided as standard or optional equipment on new watercraft 15 or would be made available as an add-on kit for existing watercraft 15.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A watercraft-specific illumination system, consisting of:

an LED-based internal light source configured to embed within a rub rail of a watercraft for providing continuous linear illumination along both port and starboard sides, wherein said LED is capable of emitting multi-colored light, including RGB spectrum, and is mounted on a mounting strip located on an interior portion of a base molding, which base molding is constructed from materials selected from a group consisting of opaque flexible rubber and stainless steel, tailored for marine environmental resilience;

a combination control box electronically coupled to the LED light source via marine-grade wiring, housing both a radiofrequency controller equipped with a radiofrequency antenna for signal reception and transmission and a light source amplifier, designed to amplify light intensity and signal clarity, said combination control box being powered by a watercraft's electrical system and encased within a watertight enclosure for protection against marine elements;

a wireless control box, remotely operable by a wireless control device through radiofrequency communication, enabling user control over light characteristics including but not limited to color, brightness, fade, strobe patterns, and additional visual effects, wherein said control device is capable of being a dedicated controller or a personal electronic device, including smartphones, utilizing Bluetooth technology for communication;

an integration of audio-visual synchronization, allowing the light source to react and synchronize with audio signals received from any style of audio source connected to the wireless control device; and, a data connectivity feature facilitating an interconnection of multiple control boxes and the integration with external control devices, including but not limited to DMX controllers, for advanced illumination pattern programming and control, aiming to improve watercraft visibility and safety through pre-programmed distress signaling patterns; and, wherein, the system further includes a plurality of mounting brackets for secure attachment of the control boxes to the watercraft, and transparent covers attached to the control boxes via attachment holes, ensuring operational integrity and maintenance access in marine environments; and, wherein the system is specifically configured for adaptation to watercraft of various sizes, including but not limited to ski boats, with provisions for scalability and customization based on watercraft dimensions and user preferences.

* * * * *